United States Patent
Capasso et al.

(10) Patent No.: US 8,723,145 B2
(45) Date of Patent: May 13, 2014

(54) PLASMONIC POLARIZER WITH A RING SHAPED WAVEGUIDE

(71) Applicant: President and Fellows of Harvard College, Cambridge, MA (US)

(72) Inventors: Federico Capasso, Cambridge, MA (US); Nanfang Yu, New York, NY (US); Romain Blanchard, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/020,153

(22) Filed: Sep. 6, 2013

(65) Prior Publication Data

US 2014/0016895 A1    Jan. 16, 2014

Related U.S. Application Data

(60) Division of application No. 13/223,409, filed on Sep. 1, 2011, now Pat. No. 8,552,410, which is a continuation-in-part of application No. PCT/US2010/026762, filed on Mar. 10, 2010.

(60) Provisional application No. 61/159,019, filed on Mar. 10, 2009.

(51) Int. Cl.
    *G02B 6/122*    (2006.01)

(52) U.S. Cl.
    CPC .................................. *G02B 6/1226* (2013.01)
    USPC ................... 250/493.1; 372/43.01; 359/738; 385/129; 385/37

(58) Field of Classification Search
    USPC .................... 250/493.1; 372/43.01; 359/738; 385/129, 37
    See application file for complete search history.

(56) References Cited

U.S. PATENT DOCUMENTS 5,274,720 A  *  12/1993  Yamamoto .................... 385/129
5,835,458 A  *  11/1998  Bischel et al. ............. 369/44.12
7,057,151 B2     6/2006  Lezec et al.
8,213,476 B1     7/2012  Wanke et al.
(Continued)

FOREIGN PATENT DOCUMENTS

WO    WO 2009/067540 A1    5/2009

OTHER PUBLICATIONS

Capasso, Federico , "Quantum Cascade Lasers: past, present and future", *International Quantum Cascade Lasers School & Workshop Monte Verita* , pp. 1-49 Sep. 14, 2008.

(Continued)

*Primary Examiner* — Kiet T Nguyen
(74) *Attorney, Agent, or Firm* — Modern Times Legal; Robert J. Sayre

(57) ABSTRACT

A radiation-emitting device (e.g., a laser) includes an active region configured to generate a radiation emission linearly polarized along a first polarization direction and a device facet covered by an insulating layer and a metal layer on the insulating layer. The metal layer defines an aperture through which the radiation emission from the active region can be transmitted and coupled into surface plasmons on the outer side of the metal layer. The long axis of the aperture is non-orthogonal to the first polarization direction, and a sequential series of features are defined in or on the device facet or in the metal layer and spaced apart from the aperture, wherein the series of features are configured to manipulate the surface plasmons and to scatter surface plasmons into the far field with a second polarization direction distinct from the first polarization direction.

10 Claims, 15 Drawing Sheets

(56) References Cited

U.S. PATENT DOCUMENTS 8,315,282 B2 * 11/2012 Huber et al. .................. 372/18
8,328,396 B2    12/2012 Capasso et al.

OTHER PUBLICATIONS

European Patent Office, "International Search Report and Written Opinion Application No. PCT/US2010/026762", *International Search Report and Written Opinion*, pp. 1-9 Sep. 29, 2010.

Yu, Nanfang et al., "Quantum cascade lasers with integrated plasmonic antenna-array collimators", *Optics Express*, vol. 16, No. 24, pp. 19447-19461 Nov. 24, 2008.

Yu, Nanfang et al., "Small-divergence semiconductor lasers by plasmonic collimation", *nature photonics*, vol. 2, Issue 9, pp. 564-570 Sep. 2008.

* cited by examiner

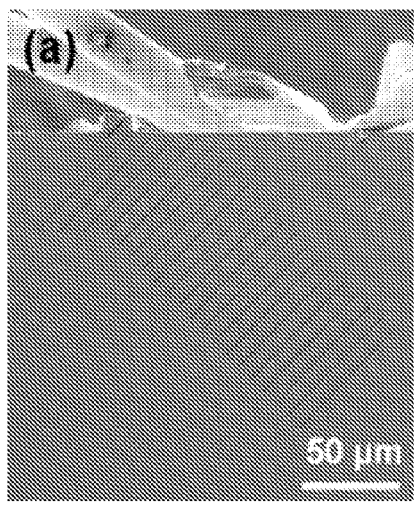
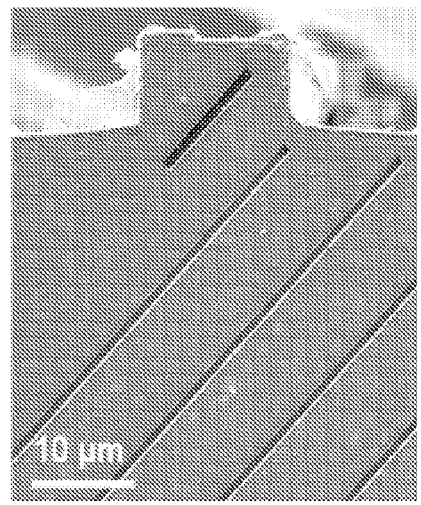
FIG. 6  FIG. 7
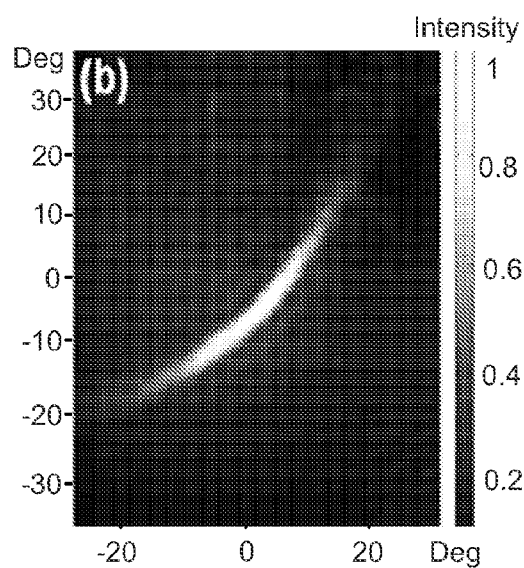
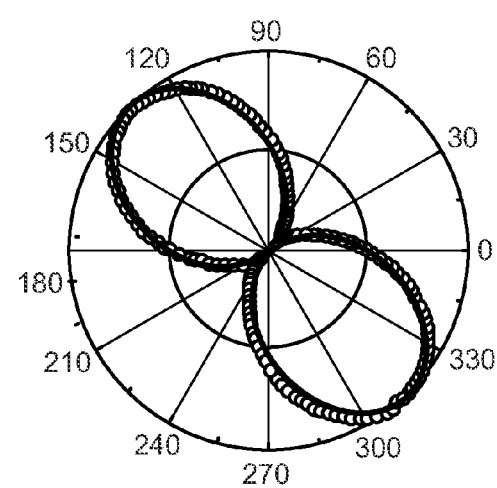
FIG. 8  FIG. 9

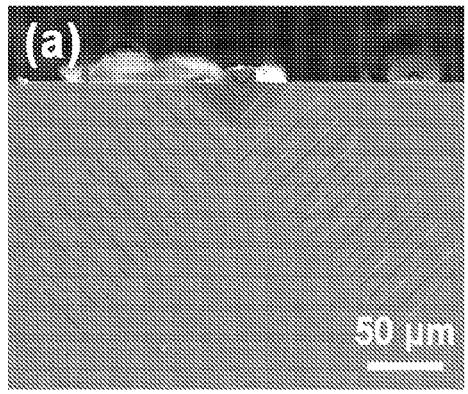
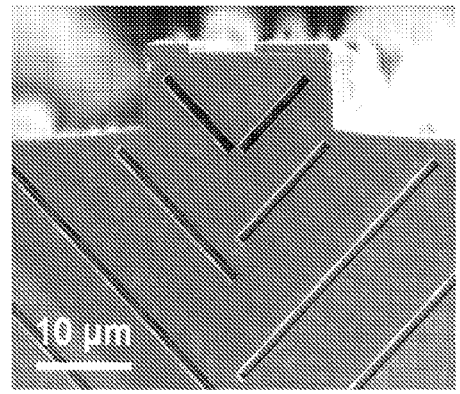
FIG. 10   FIG. 11
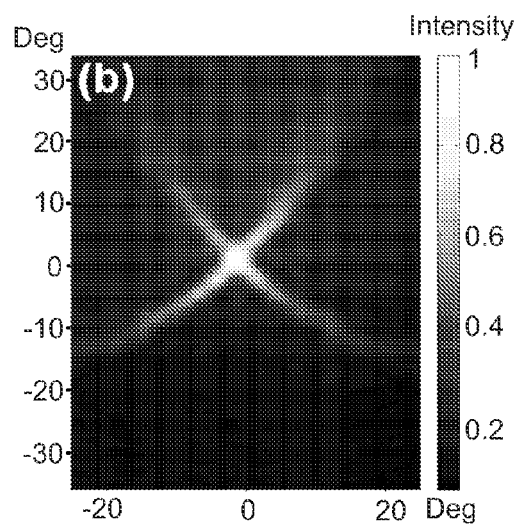
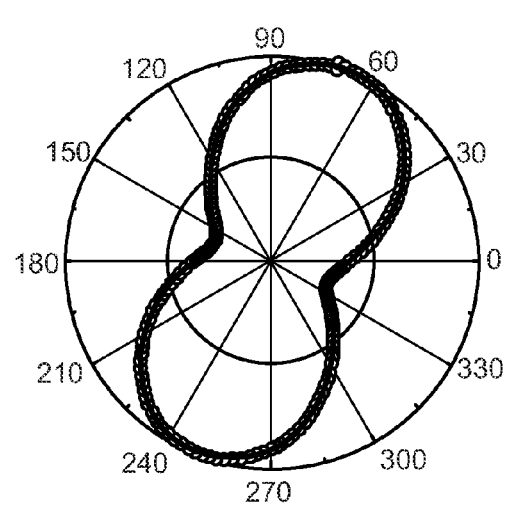
FIG. 12   FIG. 13

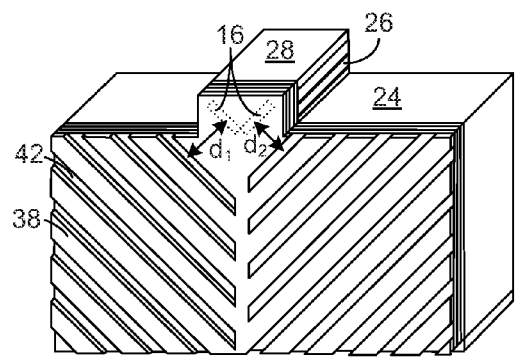
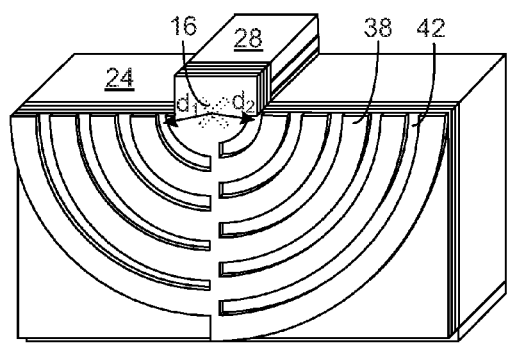
FIG. 27  FIG. 28
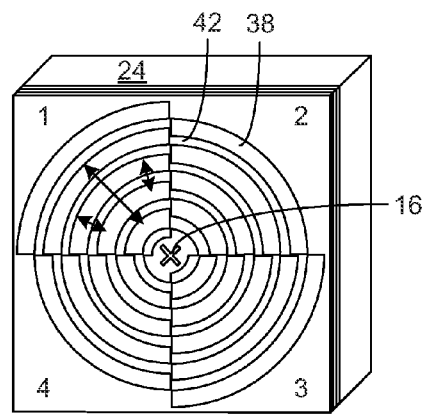
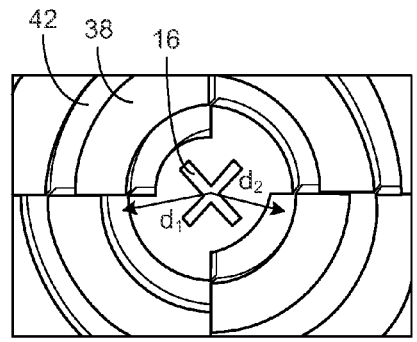
FIG. 29  FIG. 30
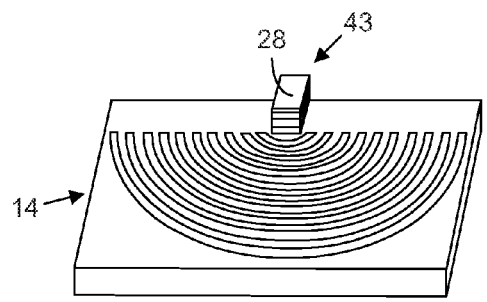
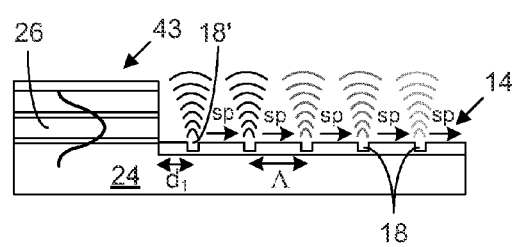
FIG. 31  FIG. 32

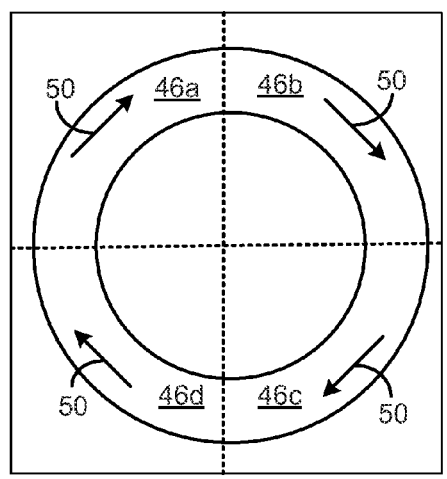
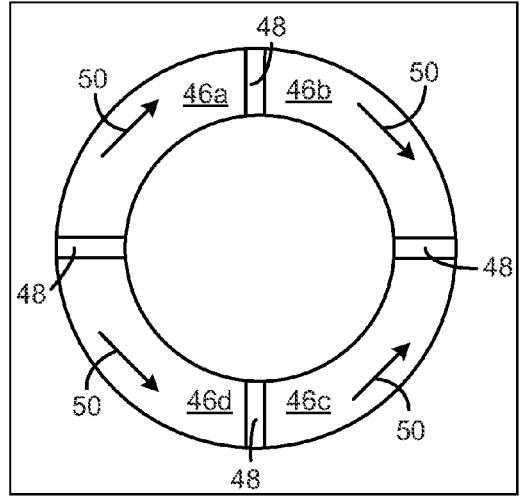
FIG. 38   FIG. 39
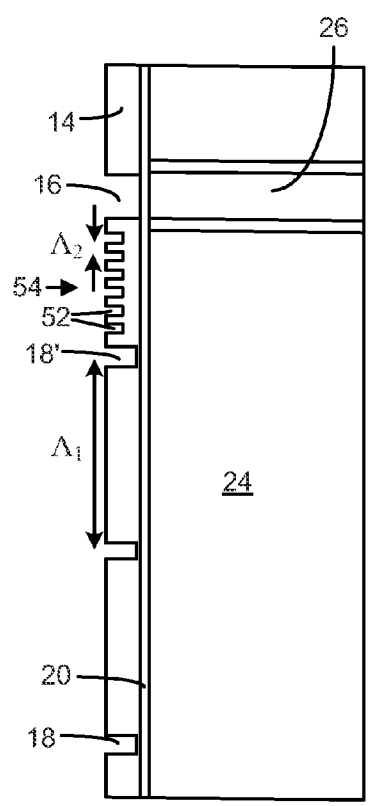
FIG. 40

PLASMONIC POLARIZER WITH A RING SHAPED WAVEGUIDE

RELATED APPLICATION

This application is a divisional of U.S. application Ser. No. 13/223,409, filed 1 Sep. 2011, which is a continuation-in-part of PCT Application No. US2010/026762, filed 10 Mar. 2010, the entire teachings of each of which are incorporated herein by reference. This application also claims the benefit of U.S. Provisional Application No. 61/159,019, filed 10 Mar. 2009, the entire content of which is incorporated herein by reference.

GOVERNMENT SUPPORT

The invention was supported, in whole or in part, by a grant under contract number FA9550-04-1-0434 from the Air Force Office of Scientific Research and by a grant under contract number ECS-0335765 from the National Science Foundation. The United States Government has certain rights in the invention.

BACKGROUND

Polarization is defined as the orientation of the oscillation of the electric field in the plane perpendicular to the electromagnetic wave's direction of travel. The electric field vector can be arbitrarily divided into two perpendicular components. The two components can have distinct amplitudes and phases. When the two components are in phase (i.e., where the phase difference is equal to 0 or 180 degrees), the electric field vector has a constant direction, the tip of the electric field vector traces out a single line; and this case is, therefore, called linear polarization. When the two components have the same amplitude and are exactly 90 or 270 degrees out of phase, the electric field vector traces out a circle in the plane, so this case is referred to as circular polarization. If the two components are out of phase by a factor not equal to 0, 90, 180, or 270 degrees, or if the two components do not have the same amplitude, the tip of the electric field vector traces out an ellipse; accordingly, this case is recognized as elliptical polarization.

Producing a light source that has a desired polarization is important for many applications. In satellite communication, two orthogonal polarization states (e.g., vertical and horizontal polarizations, or right- and left-circular polarizations) are used to achieve a two-to-one frequency reuse, thereby doubling the services a satellite can provide. Additionally, polarization is of great importance in chemistry and biomedical sciences due to the circular dichroism (CD) that is exhibited by many chiral molecules, such as various organic molecules, proteins and DNAs. Further, CD spectroscopy is based on the differential absorption of left- and right-circularly polarized light in specimens. Mechanical engineers, as well, use polarized light to detect strain and stress in prototypes because strain and stress induces birefringence. Laser sources with a variety of polarization states are also used for quantum cryptography.

Many light sources [e.g., light-emitting diodes (LEDs)], however, are randomly polarized. Semiconductor lasers are mostly linearly polarized—either transverse electric ("TE"—i.e., wherein the electric field lies in the plane of the device material layers) or transverse magnetic ("TM"—i.e., wherein the electric field is perpendicular to the plane of the device material layers); the polarization is determined by the optical selection rules of the gain medium. Intrinsically polarization-controllable light sources are highly desirable but are very challenging to build. For example, the realization of circularly polarized lasers or LEDs has proven elusive.

Conventionally, selection and manipulation of the polarization state of light output is conducted externally using bulky and usually expensive optical components. To create linearly polarized light, absorptive polarizers (e.g., wire-grid polarizers), or beam-splitting polarizers (e.g., Nicol prisms and Wollaston prisms) are used. To change the polarization direction of linearly polarized light, absorptive polarizers and half-wave plates are used. To generate circularly and elliptically polarized light, wave plates are used. The latter are based on birefringence and work by producing phase shift between the two perpendicular components of the electric field of a beam of light. Many of the optical components require customer design and manufacturing, and some of the optical components are only available for a limited range of spectrum. For example, wave plates are usually available from the visible to near-infrared spectrum regimes ($\lambda_o$=450~1600 nm).

SUMMARY

A plasmonic polarizer and methods for fabrication and use are described herein. Various embodiments of the device and method may include some or all of the elements, features and steps described below.

In one embodiment, a radiation-emitting device (e.g., a laser) includes an active region configured to generate a radiation emission linearly polarized along a first polarization direction and a device facet covered by an insulating layer and a metal layer on the insulating layer. The metal layer defines an aperture in the form of a slit through which the radiation emission from the active region can be transmitted and coupled into surface plasmons on the outer side of the metal layer. By using the term "surface plasmons" in this invention, we refer to any radiation or electromagnetic waves that are in interaction with a metal surface, either flat or corrugated.

The long axis of the aperture is non-orthogonal to the first polarization direction, and a sequential series of features (e.g., grooves) are defined in or on the device facet or in the metal layer and spaced apart from the aperture and along an axis that is orthogonal to the long axis of the aperture, wherein the series of features are configured to manipulate the surface plasmons and to scatter surface plasmons into the far field with a second polarization direction distinct from the first polarization direction.

The radiation-emitting device can also include a metasurface of fine features (e.g., fine grooves) between the aperture and the first surface-plasmon-scattering feature to create an effective medium for surface plasmon propagation.

In another embodiment, a double-metal-waveguide structure is provided on the device facet. The double-metal-waveguide structure includes a transparent dielectric layer sandwiched between two metal layers. An aperture is defined in the inner metal and through it the radiation emission from the active region can be transmitted and coupled into surface plasmons on the interfaces between the transparent dielectric and the two metal layers. A sequential series of apertures are defined in the outer metal layer along an axis that is orthogonal to the long axis of the aperture for radiation emission. This series of apertures scatters the surface plasmons into the far field.

The radiation-emitting device can also include a split ridge with a pair of facets oriented non-parallel to each other for producing two distinct radiation emissions.

Another embodiment includes a ring-shaped waveguide with a grating including a series of apertures on top of the waveguide. The series of apertures includes apertures spaced apart from neighboring apertures by a consistent fixed distance as well as phase-shifters. The apertures couple radiation emission out from the waveguide, and the phase-shifters help achieve phase shift between radiation emissions from different regions of the ring-shaped waveguide. These radiation emissions combine to form circularly or elliptically polarized radiation in the far field.

The plasmonic polarizer enables the construction of polarization-controllable sources of light (or other forms of radiation), such as edge- or surface-emitting semiconductor lasers, optical fibers or fiber lasers, and light-emitting diodes. These light sources offer great potential advantage in applications ranging from satellite communications and quantum information processing to novel detection methods for chiral molecules in chemistry and biology.

BRIEF DESCRIPTION OF THE DRAWINGS

FIGS. 6 and 7 are electron micrographs of the facet of a quantum cascade laser integrated with a plasmonic polarizer.

FIG. 8 is a two-dimensional far-field emission pattern of the laser of FIGS. 6 and 7.

FIG. 9 plots the measured device output power as a function of the rotation of the wire-grid polarizer.

FIGS. 10 and 11 are electron micrographs of the facet of a quantum cascade laser integrated with a plasmonic polarizer.

FIG. 12 is a measured two-dimensional emission pattern of the laser of FIGS. 10 and 11.

FIG. 13 plots the measure optical power of the central spot in the emission pattern of FIG. 12 while a wire-grid polarizer was rotated in front of the detector.

FIG. 23-27 are schematic illustrations showing different stages in the fabrication procedure of a double-metal-waveguide plasmonic polarizer on a laser facet.

FIG. 28 is a schematic illustration showing an improved double-metal-waveguide plasmonic polarizer.

FIGS. 29 and 30 are schematic illustrations showing a double-metal-waveguide plasmonic polarizer integrated on the facet of a VCSEL, LED, optical fiber or fiber laser.

FIG. 31 is a schematic illustration showing a surface-emitting plasmonic polarizer placed adjacent to the end of a laser ridge.

FIG. 32 is a schematic illustration showing the working mechanism of the plasmonic polarizer of FIG. 31.

FIG. 38 shows how the electric field vectors would align in a clockwise way without the phase shifters.

FIG. 39 shows that, with the phase shifters, the electric field vectors of the surface emissions from sections 1 and 3 are parallel and oscillating in phase, and the electric field vectors of the surface emissions from sections 2 and 4 are also parallel and oscillating in phase; but the two pairs are 90 degrees out of phase so that, together, they produce circularly polarized light in the far field.

FIG. 40 is a sectional view of a design with a "meta-surface" that can enhance the coupling of laser light into surface plasmons on the laser facet.

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
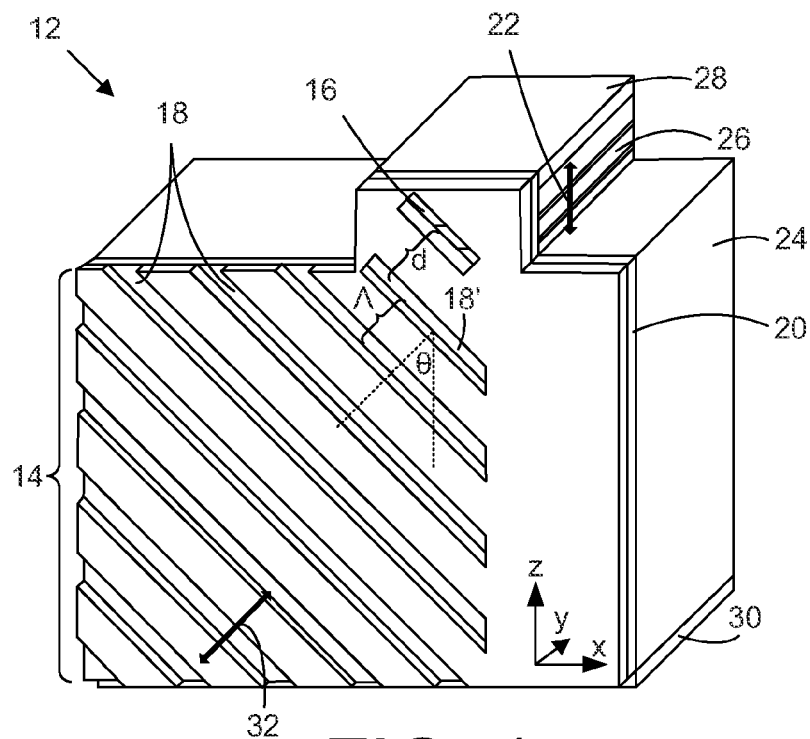
FIG. 1 is a schematic illustration of a plasmonic polarizer integrated onto the facet of a quantum cascade laser, which is intrinsically TM-polarized.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, terms (including technical and scientific terms) used herein have the same meaning as commonly understood by one of ordinary skill in the art to which the invention belongs. It will be further understood that terms, such as those defined in commonly used dictionaries, are to be interpreted as having a meaning that is consistent with their meaning in the context of the relevant art and are not to be interpreted in an idealized or overly formal sense unless expressly so defined herein. For example, if a particular composition is referenced, practical and imperfect realities may apply; e.g., the potential presence of at least trace impurities (e.g., at less than 0.1% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms "a," "an" and "the" are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

A new type of photonic element, referred to herein as a plasmonic polarizer, is defined on a metal film and includes microfabricated structures, such as apertures, gratings, or antennas. The plasmonic polarizer can be integrated onto the emission facet of a laser or some other radiation-emitting device, such as a light-emitting diode, optical fiber or fiber laser, and is capable of manipulating the polarization state of the output light (e.g., rotating the polarization direction of a linearly polarized light source by an arbitrary angle or transforming a linearly polarized light beam into circularly polarized or elliptically polarized light). The plasmonic polarizer design can be scaled to manipulate the polarization of emitted light from the visible to the far-infrared wavelength regimes.

The integrated plasmonic polarizer described here provides a compact solution, allowing the development of polarization-controllable active and passive devices over a wide frequency range, from the visible to the far-infrared, with a design that includes the integration of plasmonic structures on the emission surface of a light source.

Mid-infrared (mid-ir) edge-emitting quantum cascade lasers (QCLs) are used as a model system to describe the invention. Similar design can be applied to other edge-emitting semiconductor lasers. The following paragraphs describe plasmonic polarizers capable of transforming the output of a QCL into linearly, circularly, and elliptically polarized light of the desired characteristics. Designs for surface-emitting lasers, LEDs, optical fibers or fiber lasers are discussed afterward.

Figures 4, 5:
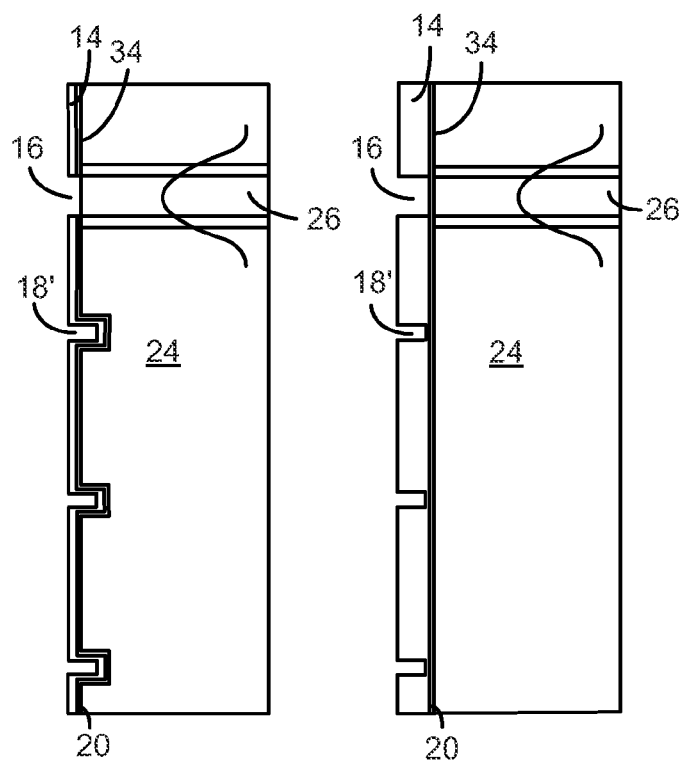
FIGS. 4 and 5 are drawings of two configurations for implementing the plasmonic polarizer.

Linear Polarization:

QCLs are based on intersubband transitions between quantized electronic levels confined in the conduction band of a semiconductor heterostructure. As such, QCLs are intrinsically transverse magnetic (TM) polarized—the electric field of the mode is parallel to the growth direction of the heterostructure (i.e., the z direction shown in FIG. 1). To rotate the polarization of a QCL 12 by an angle, θ, an aperture-grating plasmonic structure is used on the facet 34 of the QCL 12, as shown in FIGS. 1 and 4. As shown in FIG. 1, the QCL includes an active region 26 on a substrate 24, with an insulating dielectric 20 on the substrate 24, and a metallic grating 14 on the insulating dielectric 20. An aperture 16 is defined in the metallic layer that includes the grating 14. Furthermore, a top metal electric contact 28 and a back metal electric contact 30 are provided on opposite sides of the QCL 12.

The normal to the aperture 16 and the grating grooves 18 is at an angle, θ, from the vertical direction; d is the distance between the aperture 16 and the nearest grating groove 18'; and Λ is the grating period. The orientation of the aperture 16, in the form of a slit, is understood to be parallel to the edge of the aperture 16 extending along the longest aperture dimension; the orientation of the aperture 16 is at an angle of less than 90° to the polarization direction 22 of the radiation emission generated in the active region 26 (e.g., at an angle between 0 and 85°, and in the particular embodiment of FIG. 1, at an angle of about 45°).

The aperture 16 is defined on the laser active region 26, where light exits the laser, and is subwavelength in one dimension and comparable to the free-space wavelength in the other dimension. Only the component of the laser polarization perpendicular to the grooves 18 couples to surface plasmons (SPs) propagating along the grating 14. The output of the device 12 is thus an interference pattern produced by direct emission from the aperture 16 and reemissions from the grating grooves 18 due to Bragg scattering of surface plasmons by the grating 14. The polarization of the reemitted light is along the θ direction, determined by the orientation of the grooves 18. The polarization of the direct emission from the aperture 16 is mainly polarized in the direction indicated by θ, which is perpendicular to the long axis of the aperture 16 (as shown by arrow 32), because the power throughput of the field component perpendicular to the long axis of the aperture 16 is significantly larger than that of the field component parallel to the long axis of the aperture 16. As a result, the output of the device 12 is polarized along the θ direction, as shown by arrow 32. It should be noted that an aperture 16 without the grating 14 would result in radiation mainly polarized in the θ direction but with large beam divergence. The grating 14 greatly reduces the beam divergence angle along the θ direction due to the interference effect.

Several geometric parameters can be optimized to achieve the highest power throughput, including the distance, d, between the aperture 16 and the nearest groove 18'; the grating period, Λ; and the width, w (measured in the direction of the output polarization 32), and the depth, h (measured in the y direction, as shown), of the grooves 18. The positions of the grating grooves 18 (i.e., as defined by d and Λ) can ensure that the direct emission from the aperture 16 and all the reemissions from the grating grooves 18 are in phase (i.e., their phase difference is equal to integral multiples of 2π) to maximize constructive interference between them. Narrow grooves (i.e., with w typically smaller than 20% of the free space wavelength, $\lambda_o$) are chosen so that each individual groove 18 introduces only a small disturbance to the surface-plasmon propagation and so that surface plasmons transmit far enough across the device facet 34 to induce many reemissions. The groove depth, h, is adjusted to allow the creation of groove cavity modes (i.e., standing waves) along the depth of the grooves 18. The resonance condition makes the otherwise inefficient scatters (i.e., the narrow grooves) effective in coupling surface plasmons into free space. Physical considerations used to determine these parameters are further discussed in N. Yu, et al., "Small-Divergence Semiconductor Lasers by Plasmonic Collimation," 2 Nature Photon. 564-570 (September 2008) and in N. Yu, et al., "Quantum Cascade Lasers with Integrated Plasmonic Antenna-Array Collimators," 16 Opt. Express 19447-461 (November 2008).

Optimal parameters for $\lambda_o$=9.9 μm QCLs are d=7.1 μm and Λ=9.4 μm with a groove depth, h, of 1.5 μm; a groove width, w, of 0.8 μm; a metal film (e.g., gold) thickness equal to 600 nm; and an insulating dielectric film (e.g., alumina) thickness equal to 200 nm. Suitable compositions for the metal coatings can include at least one noble metal, such as gold, silver, copper and/or at least one transition metal, such as chromium, titanium, aluminum or others. Suitable compositions for the insulating dielectric film can include at least one of alumina, silicon dioxide, magnesium fluoride, zinc selenide or others. The substrate can be indium phosphide and/or gallium arsenide. The top and back electric contacts can be gold and/or copper. The active region of quantum cascade lasers is composed of quantum wells made of indium gallium arsenide/indium aluminum arsenide, gallium arsenide/aluminum gallium arsenide or other pairs of III-V or II-VI group semiconductors.

Circular Polarization:

A circularly polarized beam can be constructed by coherently combining two linearly polarized beams that satisfy the following three conditions: (a) perpendicular polarizations, (b) 90° phase difference, and (c) the same amplitude. The first condition can be met by defining two aperture-grating structures on the device facet 34 with their respective orientation angles, θ=±45°. A schematic illustration of the device 12' is provided in FIG. 2. The distance between the aperture 16 and the nearest groove 18' in a series of grooves 18 on the left and right is denoted as $d_1$ and $d_2$, respectively. The grating period, Λ, is tuned to be approximately equal to the surface plasmon wavelength, $\lambda_{sp}$, so that the reemissions from the grating grooves 18 add up in phase in the direction normal to the facet 34. The polarization state of the output light can be controlled by tuning $d_1$ and $d_2$. By tuning $d_1$ and $d_2$ such that $|d_1-d_2|$ approximately equals a quarter of $\lambda_{sp}$, one can ensure that the two beams produced by the left and the right gratings 14 as a result of the interference of the reemissions will have a 90° phase difference. Possible output laser polarizations are illustrated in the lower right corner of FIG. 2.

Figure 3:
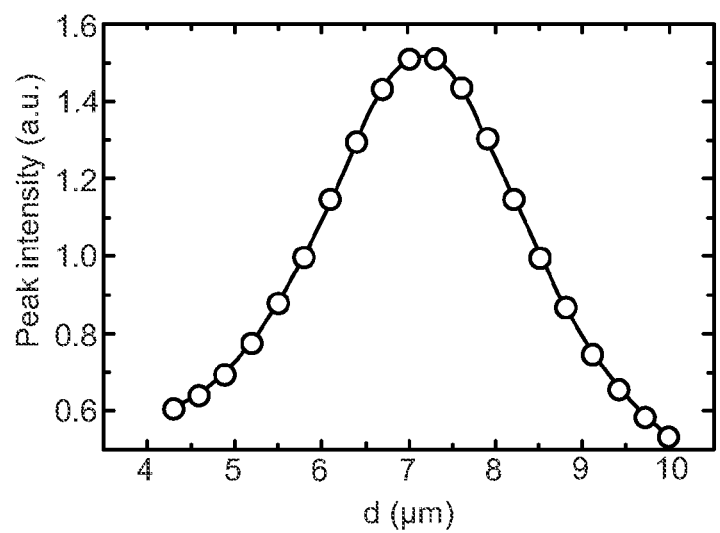
FIG. 3 is a chart showing the peak intensity of a beam created by a grating versus the distance, d, between the aperture and the first grating groove.

The peak intensity of a simulated beam created by a grating 14 versus the distance, d, between aperture 16 and the first grating groove 18' is plotted in FIG. 3. These simulation results can be used to determine the specific $d_1$ and $d_2$ so that the two beams have approximately the same amplitude. For example, from FIG. 3, one finds that, for a $\lambda_o$=9.9 μm QCL, the two beams will have 90° phase difference and the same amplitude if $d_1$=6.0 μm and $d_2$=8.3 μm. The direct emissions from the two apertures 16 have no phase difference, and they contribute to a TM (i.e., vertically) polarized optical background.

Figure 2:
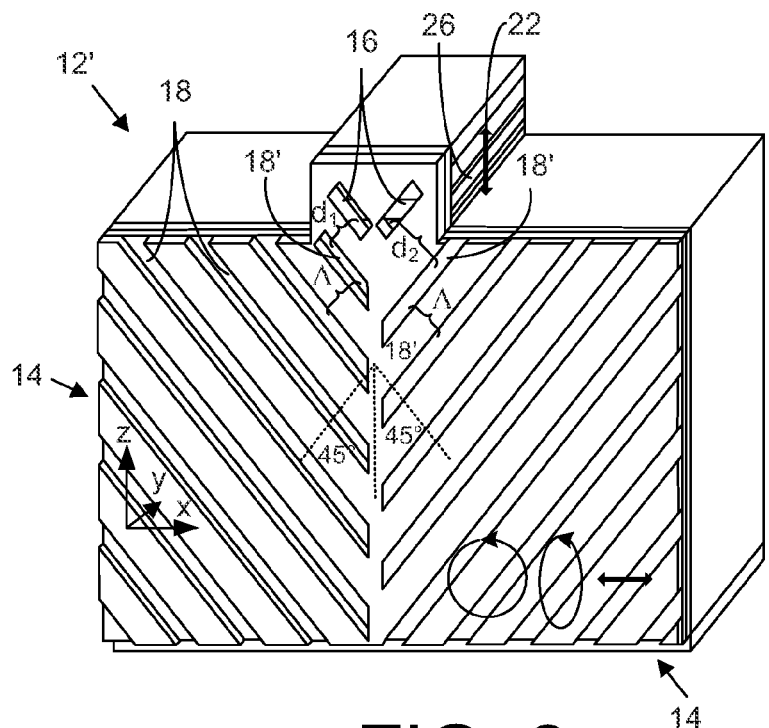
FIG. 2 is a schematic illustration of a quantum cascade laser with a plasmonic polarizer capable of producing circularly polarized, elliptically polarized or TE-polarized light.

Elliptical Polarization:

A QCL with elliptically polarized light output can be constructed using a similar structure, as shown in FIG. 2. The amplitude and phase of the two beams originating from the two gratings 14 are controllable by tuning $d_1$ and $d_2$. If their amplitude is different and/or if their phase difference is not 90°, the intersection of the two beams will be elliptically polarized. In a special case where the two beams have the same amplitude and a phase difference of 180°, the output light will be TE polarized with electric field in the plane of the waveguide layers (i.e., in the x direction, as shown in FIG. 2). In this case, the plasmonic polarizer functions as a half-wave plate.

Experimental Results for Linearly and Circularly Polarized QCLs:

Some initial experimental results on manipulating the polarization state of QCLs have been obtained. Specifically, using the integrated plasmonic polarizer, the polarization of a TM-polarized QCL was rotated by 45°. By designing a facet with two orthogonal grating-aperture structures, a polarization state consisting of a superposition of linearly and right-circularly polarized light was demonstrated, a first step towards a circularly polarized laser.

The fabrication procedure started with focused ion beam (FIB) milling of grating grooves 18 in the indium phosphide substrate of a QCL. Next, a 200-nm-thick alumina dielectric film 20 was deposited onto the laser facet 34 for electrical insulation using electron-beam evaporation, and a 600-nm-thick gold film was then deposited using thermal evaporation to form the grating 14. Multi-angle deposition was implemented such that the walls of the grooves 18 were also covered by the alumina and gold films. Finally, FIB milling was used a second time to open the aperture 16 through the gold film in front of the laser active core 26. The grooves 18 were cut into semiconductor substrates 24 before any deposition (as shown in FIG. 4)—instead of first depositing a thick gold film and then cutting the grooves 18 into it afterwards to form the grating 14 (as shown in FIG. 5)—because FIB mills smooth features in a semiconductor, while milling in a metal usually results in pronounced roughness due to the large size of the crystallites in the metal. These two configurations for implementing plasmonic polarizers are equivalent in terms of beam collimation and power throughput.

Electron micrographs are provided as FIGS. 6 and 7, showing different magnifications of the facet of a QCL patterned with a plasmonic polarizer, where θ (i.e., the angle perpendicular to the long axis of the slit aperture measured from the −z axis, as shown) is 45°. FIG. 7 is a magnified view of FIG. 6. The aperture has a size of 1.1×11.5 μm². The measured two-dimensional (2D) far-field emission profile of the device is shown in FIG. 8. It is observed that the beam divergence is reduced along the θ=45° direction. In order to determine the polarization state of the beam, a mid-ir detector and a wire-grid polarizer in front of the detector are placed in the far field where the laser intensity is maximum.

Measured power as a function of the rotation angle of the wire-grid polarizer, α (where α=0° corresponds to the +x direction in FIG. 1), is shown in FIG. 9. The open dots are experimental data and the curve is a calculation for a 45° linearly polarized light. The maxima occurred at a rotation angle corresponding to α=135° and −45° with respect to the +x direction and a high cross-polarization suppression ratio was observed, demonstrating an ability to efficiently rotate the polarization of a QCL.

The maximum power output of the device is about 30% of that of the original laser due to reduced overlap between the tilted aperture and the active region of the laser. The power of the main lobe of the far field (the crescent) contains approximately 30% of the total emitted power. The laser threshold of the device is essentially the same as the original laser. Note that the fraction of the laser power coupled into surface plasmons through the aperture decreases with increasing θ; thus the design cannot work properly to produce TE polarized light.

Experimental results for a circularly polarized laser are presented in FIGS. 10-13. FIG. 10 shows an electron micrograph of the facet of a QCL integrated with a plasmonic polarizer comprising two gratings that are orthogonal to each other, each containing 20 grooves, wherein $d_1=8.3$ μm and $d_2=6.0$ μm. FIG. 11 provides a magnified view of the polarizer structure from FIG. 10. A measured 2D far-field emission pattern of the device is shown in FIG. 12. Each grating contributes to a one-dimensionally collimated beam and the far-field pattern is cross-shaped. The measured device output (measured as the optical power of the central spot in FIG. 12) when a wire-grid polarizer was rotated in front of the detector is shown in FIG. 13.

The analysis of FIG. 13 indicates that this part of the laser beam consists of a right-circularly polarized field component and a linearly polarized field component, originating from the two gratings and the two apertures, respectively; the first component is about 1.5 times larger than the second component. More information on the circular-polarized QCLs is provided in N. Yu, et al., "Semiconductor Lasers with Integrated Plasmonic Polarizers," 94 Appl. Phys. Lett. 151101 (April 2009).

Figure 14:
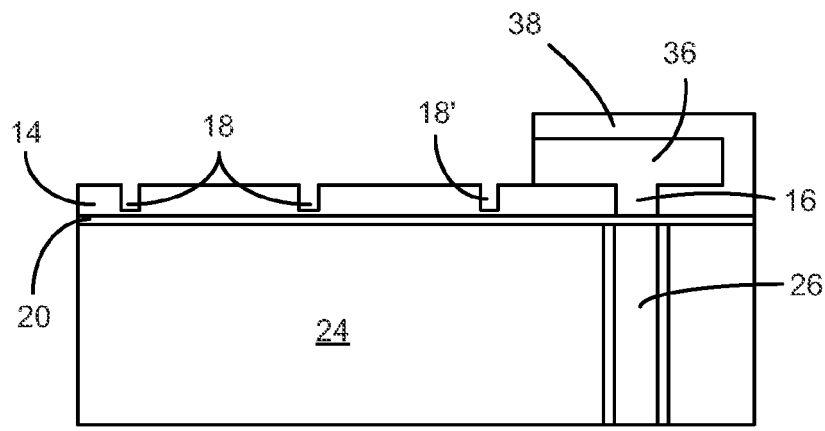
FIG. 14 is a schematic drawing showing another embodiment of a plasmonic polarizer design.
Figure 15:
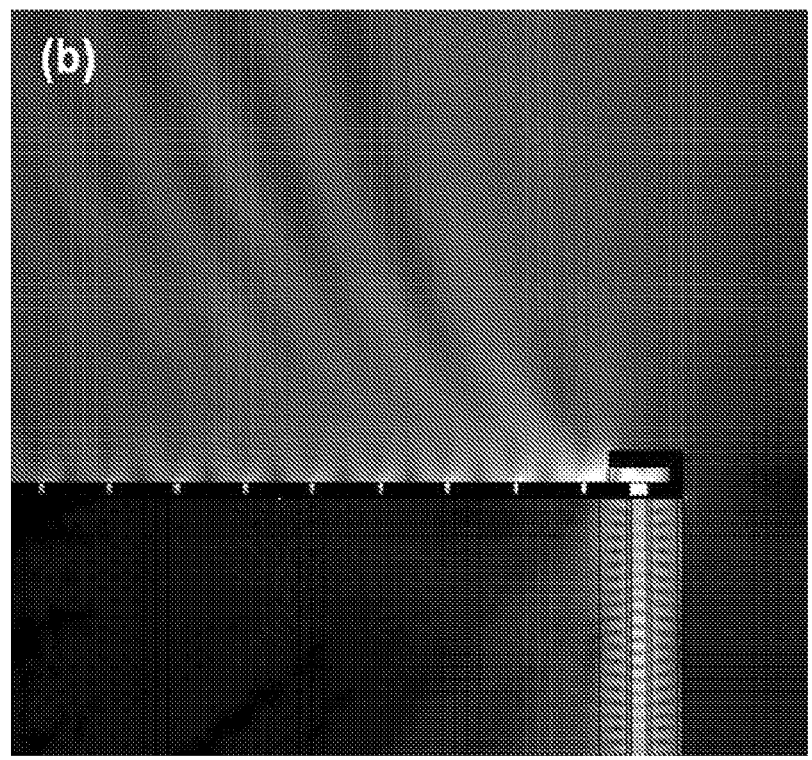
FIG. 15 is a simulated image of the two-dimensional light intensity distribution around the aperture of the design of FIG. 14.
Figure 16:
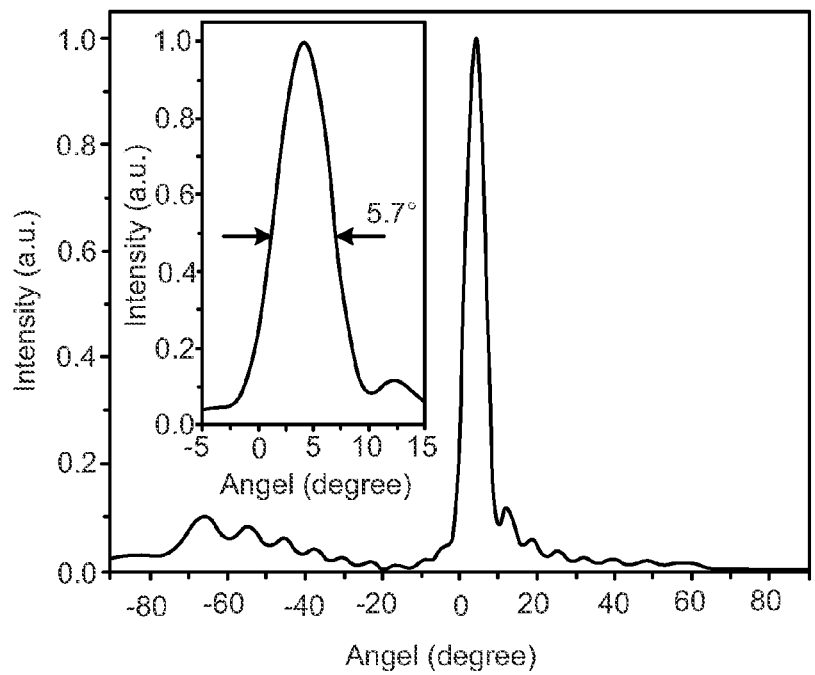
FIG. 16 plots a calculated far-field intensity distribution normal to the grating grooves for the design of FIG. 14.

Additional Designs:

In the experimental results on circularly polarized QCLs described in the preceding section, the laser output is a superposition of a circularly polarized component and a non-negligible linearly polarized component. Additional designs can suppress the linearly polarized direct emissions originating from the apertures. One such design is schematically shown in FIG. 14. In this additional design, the apertures 16 are first covered with a transparent dielectric 36 (e.g., magnesium fluoride, zinc selenide, intrinsic silicon, intrinsic germanium, or combinations thereof) and then with a metal film (e.g., gold) 38; the metal film 38 couples direct emissions from the apertures 16 into surface plasmons propagating on the gratings 14. Consequently, the device output is entirely contributed from the grating 14, as is shown in a simulation of the 2D light-intensity distribution around the aperture in FIG. 15. A calculated far-field intensity distribution normal to the grating grooves is shown in FIG. 16, demonstrating a concomitant collimation effect due to the grating structure. In this simulation, the laser wavelength is assumed to be 9.9 μm. There are 11 grating grooves in the simulation, though not all are shown in FIG. 15.

Figure 17:
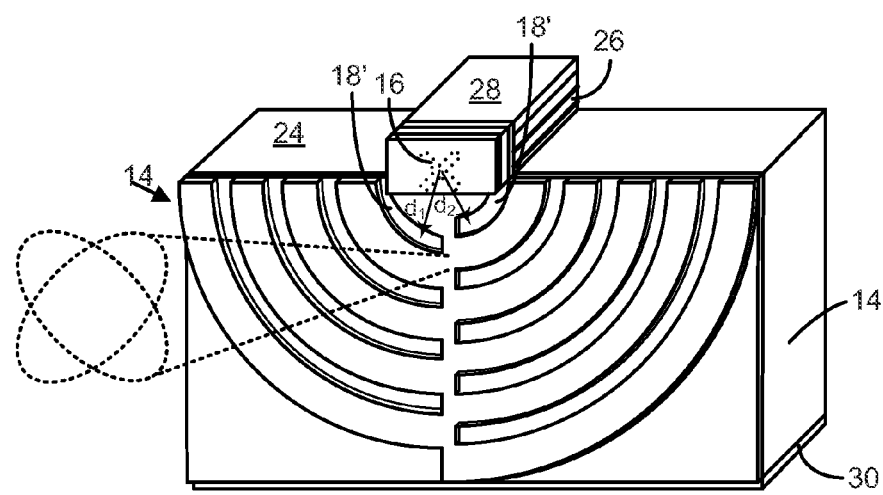
FIG. 17 is a schematic illustration showing another embodiment of a plasmonic polarizer.
Figure 18:
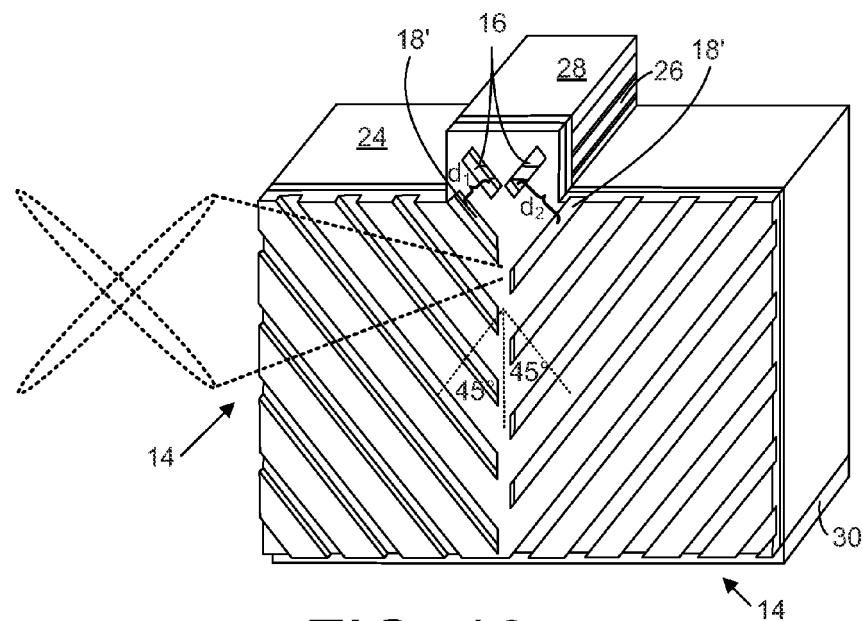
FIG. 18 is a schematic illustration showing the cross-shaped far field produced by the quantum cascade laser of FIG. 2, where only the intersection of the two one-dimensionally collimated beams is circularly polarized.

In the design shown in FIG. 2 and in FIGS. 10-13, the gratings are one dimensional with straight parallel grooves; correspondingly, the far field due to interference of reemissions from one grating is collimated only in one dimension. As a result, the far field shown in FIG. 12 is cross-shaped. The two arms of the cross are contributed from the two gratings, respectively. The two arms have a phase difference of 90 degrees, and only the intersection region of the two arms (i.e., the center of the cross, as shown in FIGS. 12 and 18) is circularly polarized. This design is not optimal because the useful part of the device output (i.e., circular polarization) is limited in power and in space. An improved design with much higher linear-to-circular polarization transformation efficiency is shown schematically in FIG. 17. The one-dimensional gratings in FIG. 2 are replaced by two-dimensional gratings comprising concentric circular grooves 18. The surface plasmons generated at the aperture 16 spread on the gratings 14 in two dimensions and are scattered into the far field, leading to complete 2D collimation in the plane parallel to the device facet 34. The radii of the first rings of the circular gratings, $d_1$ and $d_2$, are tuned such that the beam coming from the left side grating differs in phase by a factor of 90 degrees compared to the beam coming from the right side grating. The "metal cover" structure described in the last paragraph is employed to block the direct emissions from the aperture 16. The aperture 16 is a cross in this case, as shown in FIG. 17.

Figure 19:
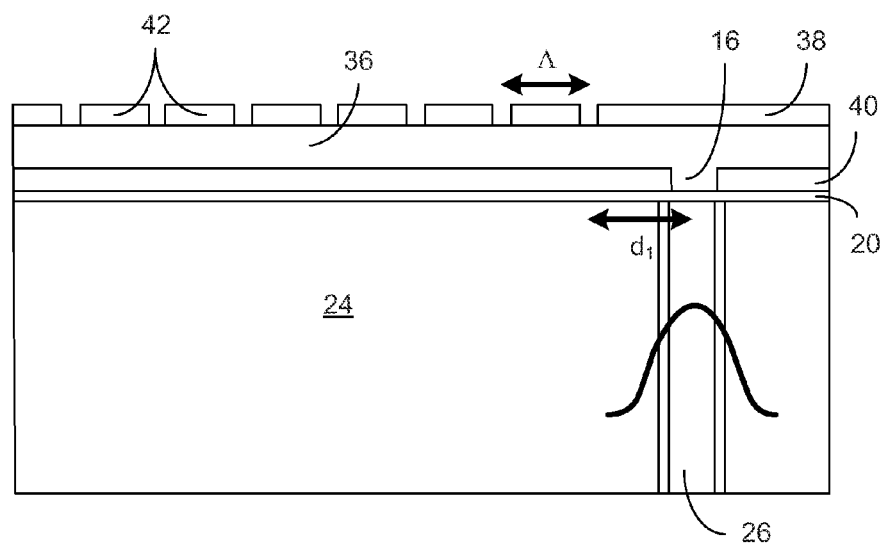
FIG. 19 is a schematic illustration of a laser with a plasmonic polarizer comprising a double-metal-waveguide plasmonic structure.
Figure 20:
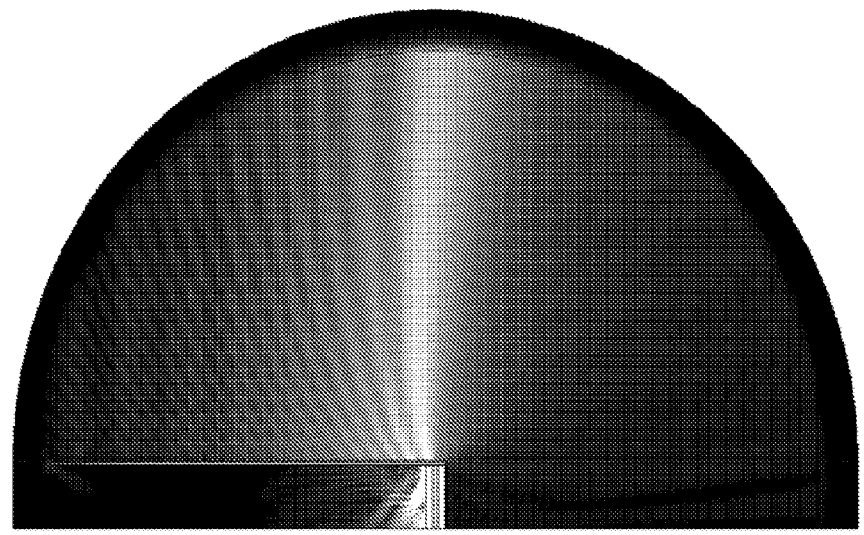
FIG. 20 is a simulated image showing the intensity distribution for the laser of FIG. 19.
Figure 21:
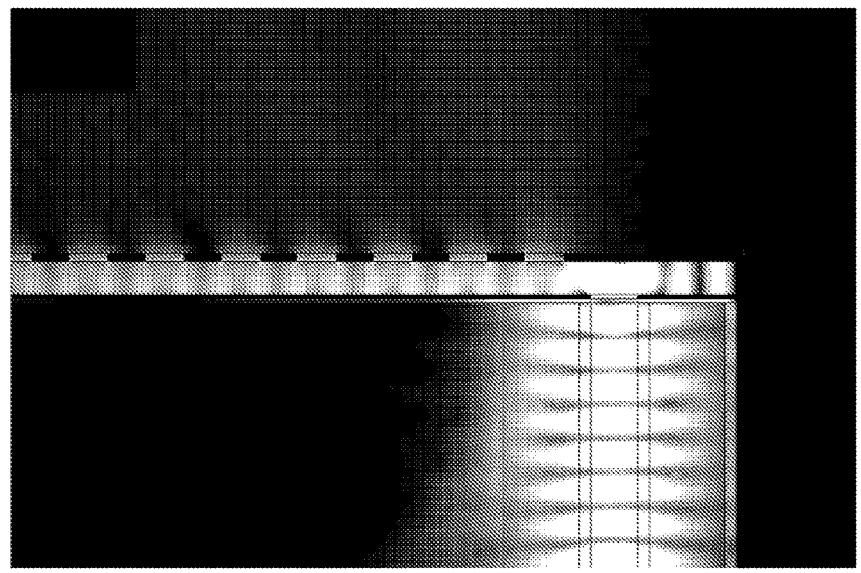
FIG. 21 is a magnified image of the plasmonic polarizer of FIG. 20.
Figure 22:
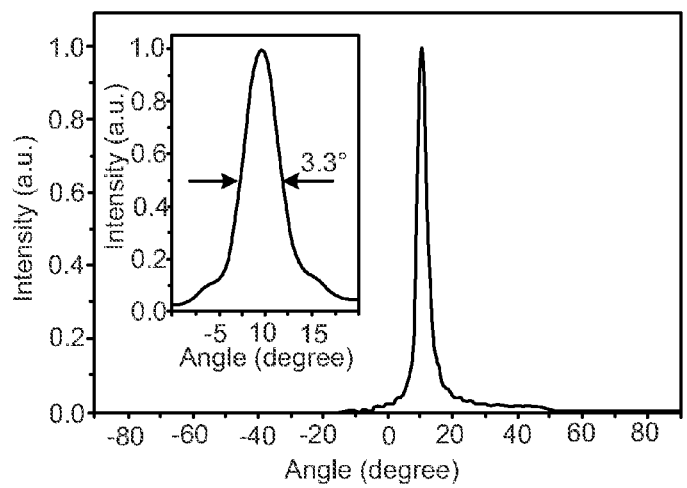
FIG. 22 plots the calculated far-field intensity distribution for the laser of FIG. 19.

Double-Metal-Waveguide Designs:

An alternative design that may be easier to fabricate is shown in cross section in FIG. 19. In this design, a transparent dielectric layer 36 is sandwiched between an outer metal layer 38 and an inner metal layer 40; together, the metal layers 38 and 40 form a double-metal waveguide. Light travels from the active region 26 through the aperture 16 defined on the inner metal layer 40 into the transparent dielectric layer 36. Surface plasmons pass along the surfaces of both of the metal layers 38 and 40, and light exits the transparent dielectric layer 36 through a series of slit apertures 42 in the outer metal layer 38. The spacing, Λ, between the slit apertures 42 is approximately equal to the wavelength of the metal-dielectric-metal waveguide mode so that all the emissions from the slit apertures 42 are in phase and interfere constructively to produce a collimated light output, as in other designs. A simulation of the intensity distribution for this structure is shown in FIG. 20 (with a magnified view provided in FIG. 21), and the calculated far-field intensity distribution for the device is shown in FIG. 22. It is assumed that there are 55 slit apertures in the simulation and calculation (though not all are shown in FIG. 21) and that the laser waveguide is 9.9 μm. Suitable compositions for the transparent dielectric layer can include at least one of magnesium fluoride, zinc selenide, intrinsic silicon, intrinsic germanium or others.

Figure 23:
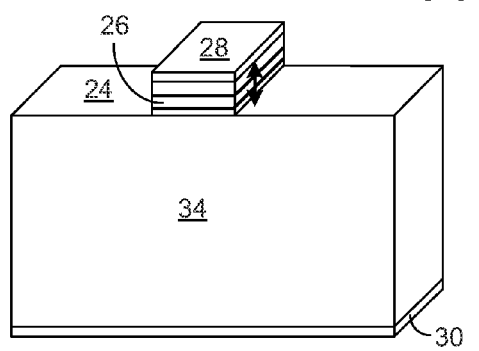
Figure 24:
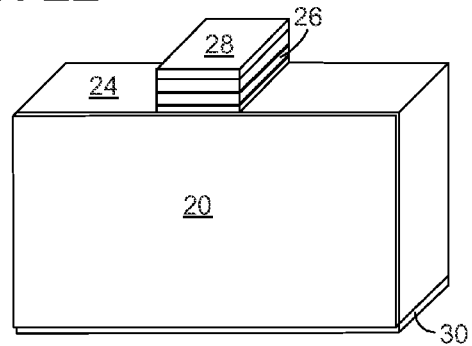
Figure 25:
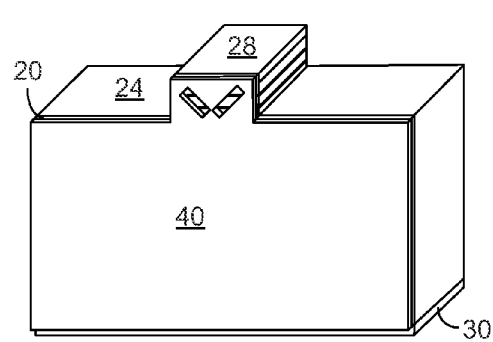
Figure 26:
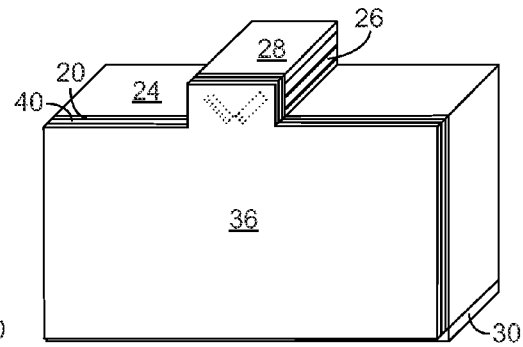

Schematics showing the fabrication procedure of the double-metal-waveguide design are provided in FIGS. 23-27. The original laser is shown in FIG. 23. The device facet 34 is coated with a thin insulating dielectric film 20, as shown in FIG. 24. A metal film 40 is then coated on the insulating dielectric film 20, and apertures 16 are opened in the metal film 40, as shown in FIG. 25. The device facet is then coated with a thick transparent dielectric layer 36, as shown in FIG. 26. The thick transparent layer 36 is then coated with an outer metal film 38, and slit apertures 42 are defined in the outer metal film 38 to form a grating, as shown in FIG. 27. Again, the one-dimensional (1D) gratings in FIG. 27 can be replaced by 2D ring gratings to achieve a much higher linear-to-circular polarization transformation efficiency, as shown in FIG. 28.

Plasmonic Polarizers for Other Light-Emitting Devices:

The designs of plasmonic polarizers discussed in the last few sections (including linear polarization, as shown in FIG. 1, and circular and elliptical polarization, as shown in FIGS. 2, 14, 17, 27, and 28) can be incorporated onto the emission facets of other light sources. The plasmonic structures can be scaled to match the emitting wavelength of a particular device. For example, a vertical-cavity surface-emitting laser (VCSEL) integrated with a double-metal-waveguide circular plasmonic polarizer with a cross-shaped aperture 16 defined in the inner metal layer 40 is schematically shown in FIG. 29

(with a magnified view provided in FIG. 30). The emission intensities from the four sections are the same, and distances $d_1$ and $d_2$ in FIG. 30 are chosen such that the emissions from sections 1 and 3 are shifted 90° compared with the emissions from sections 2 and 4. These emissions form 2D collimated circularly polarized light. These plasmonic structures can also be provided on other optical devices, such as an LED, an optical fiber, or a fiber laser.

Surface-Emitting Plasmonic Polarizers:

For edge-emitting semiconductor lasers, instead of patterning grating structures on the device facet 34 (i.e., the cleaved edge of the wafer), as shown in FIGS. 1-28, one can actually provide the patterning directly on the top surface of the wafer substrate 24; and the pattern can be positioned just outside the edge of the laser ridge 43, as shown in FIGS. 31 and 32. The following two advantages are provided by this scheme: first, the space for defining plasmonic structures is no longer limited as in the case of facet patterning (the facet area is usually about a few hundred micrometers by a few hundred micrometers); and, second, high throughput patterning techniques, such as photolithography, which do not work on the relatively small device facet, can be employed.

Figure 33:
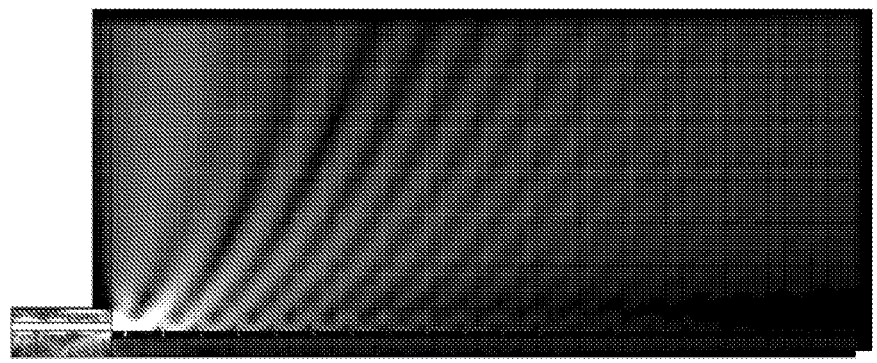
FIG. 33 is a simulated image of the two-dimensional intensity distribution of the plasmonic polarizer of FIG. 31.
Figure 34:
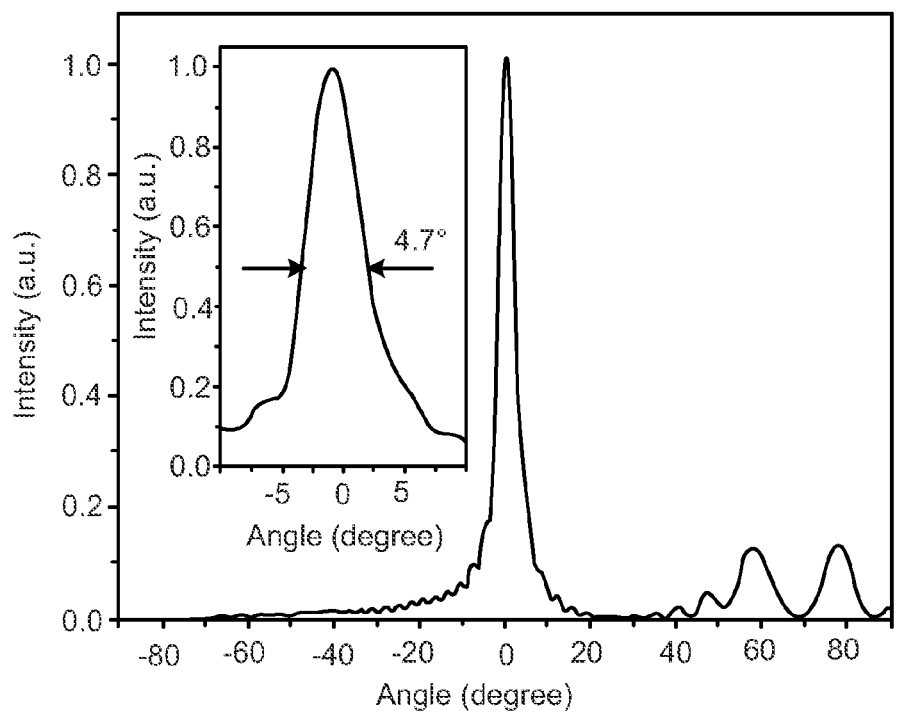
FIG. 34 is a plot of the calculated far field mode profile of the plasmonic polarizer of FIG. 31, demonstrating a collimation effect.

The function of the grating 14 in FIGS. 31 and 32 is the same as was discussed, above. FIG. 32 shows a cross section of the device along the laser ridge 43; the light emitting from the end of the ridge 43 couples directly into surface plasmons that are scattered into the far field by the grating grooves 18. The grating period is adjusted to make sure that all reemissions are in phase so a collimated beam is obtained normal to the surface of the wafer; the phase of the collimated light is adjusted by tuning the distance, $d_1$, between the first grating groove 18' and the end of the laser ridge 43. A simulation of the 2D intensity distribution for the structure is shown in FIG. 33, and the corresponding calculated far field mode profile (showing a collimation effect) is shown in FIG. 34. The laser wavelength is assumed to be 9.9 µm; and there are 20 circular grating grooves in this simulation.

Figure 35:
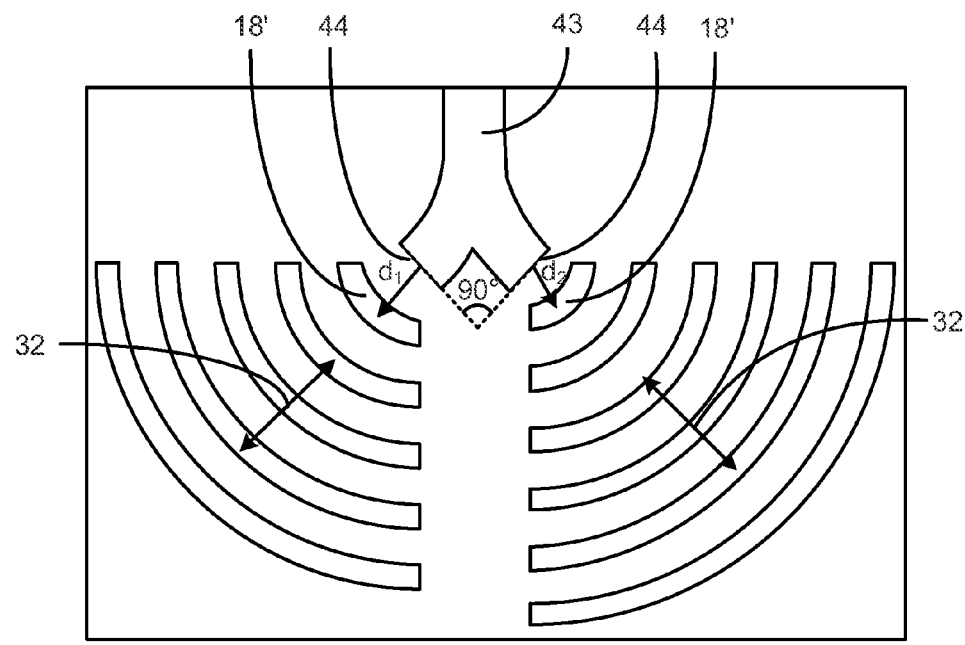
FIG. 35 is a schematic illustration showing the top view of a ridge laser with a double-headed end coupling with two circular gratings.

To create a circularly polarized beam, a laser ridge 43 with a double-headed end and two circular gratings 14 can be used. FIG. 35 shows the top view of this structure: the facets of the two branches 44 of the slitting ridge are normal with respect to each other; their output is coupled into surface plasmons on the gratings 14 and is finally scattered into the far field by the gratings 14. The two beams coming from the left grating and from the right grating have perpendicular polarization directions 32, as indicated; their intensities and phases can be controlled by tuning $d_1$ and $d_2$ (i.e., the distances between the facets of the ridge branches 44 to the first grooves 18' in the grating 14); therefore, circularly polarized or elliptically polarized light in the far field can be achieved.

Surface-Emitting Ring Lasers for Circular Polarization:

Second-order grating outcouplers have been shown to efficiently achieve surface emission in ridge lasers. Recent work on surface-emitting quantum cascade ring lasers has demonstrated the ability of this structure to achieve collimation [see E. Mujagrc, et al., "Low Divergence Single-Mode Surface Emitting Quantum Cascade Ring Lasers," 93 Appl. Phys. Lett. 161101 (October 2008)]. Advancing beyond these achievements, the following description is directed to surface-emitting ring lasers capable of producing collimated circularly polarized light in a whispering gallery mode.

Figure 36:
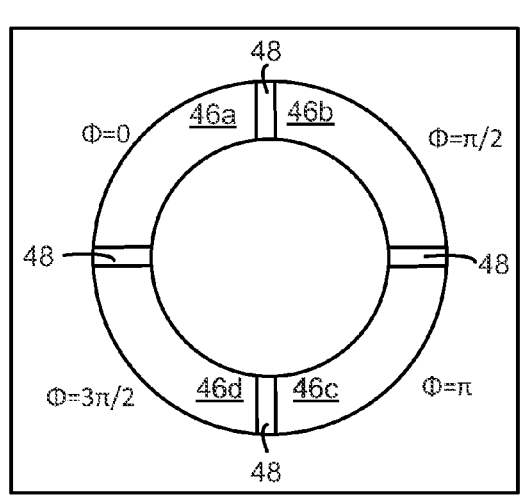
FIG. 36 is a schematic illustration showing the top view of a surface-emitting ring cavity laser with grating outcouplers patterned on the top of the laser ridge.

The top view of a surface-emitting ring cavity laser is shown in FIG. 36. Grating apertures 46 (or outcouplers) are patterned on the top of the laser ridge. Four 90-degree π/2 phase shifters 48 are inserted into the ring cavity so that the surface emissions from the four grating aperture sections 46 of the ring have phases of 0, π/2, π, and 3π/2, respectively.

Figure 37:
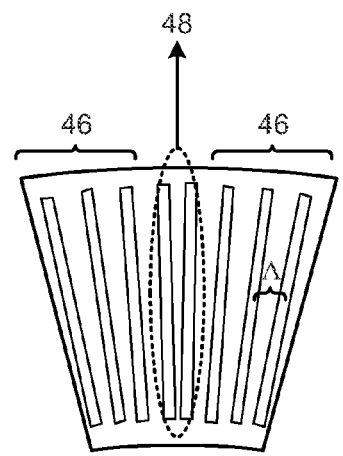
FIG. 37 shows a $\pi/2$ phase shifter in the grating outcoupler of FIG. 36.

One exemplary structure for the phase shifters 48 can be one period of grating that has a different length compared with the normal grating period, Λ, as shown in FIG. 37. As shown in FIG. 39, the 90° phase shift at each phase shifter 48 switches the polarization of emitted light above each section to the next. With these phase shifters, the electric field vectors 50 of the surface emissions from sections 46a and 46c are parallel and oscillating in phase; the electric field vectors 50 of the surface emissions from sections 46b and 46d are also parallel and oscillating in phase; but the two pairs (i.e., sections 46a and 46c compared with sections 46b and 46d) are 90 degrees out of phase, so together they produce circularly polarized light in the far field. Since the gratings are essentially two dimensional, the device output will be collimated in two dimensions. As a comparison, in an embodiment without the phase shifters, as shown in FIG. 38, the electric field vectors 50 of the surface emissions align in a clockwise way; surface emissions from sections 46a and 46c are 180 degrees out of phase, canceling each other, as are surface emissions from sections 46b and 46d, which makes surface emission very inefficient; and the far field is not circularly polarized.

Configurations, a shown, e.g., in FIGS. 36 and 37 are particularly suited for light circulating in a single direction in the ring cavity, either clock-wise or counter-clockwise. For light propagating in the opposite direction, the phase of the different grating section 48 would be instead, 0, −π/2, −π, and −3π/2. The consequence is that for light circulating in one direction, right-handed circularly polarized light is emitted, and for light circulating in the opposite direction, left-handed circularly polarized light is emitted. So when both counter-propagating waves are present in the ring cavity, the total emission is the sum of right- and left-handed circularly polarized light, which can produce linearly polarized light.

To address this issue, the waveguide design can be modified to filter out one direction of propagation, or convert one direction of propagation into the other (non-reciprocally). A basic structure that can achieve that result is a Y-coupler 60, as shown in FIGS. 43 and 44, which illustrate two exemplary implementations where a Y-coupler 60 is used to obtain a single direction of propagation on the part of the laser waveguide where the grating 46 with π/2 phase shifters 48 is patterned.

Figure 43:
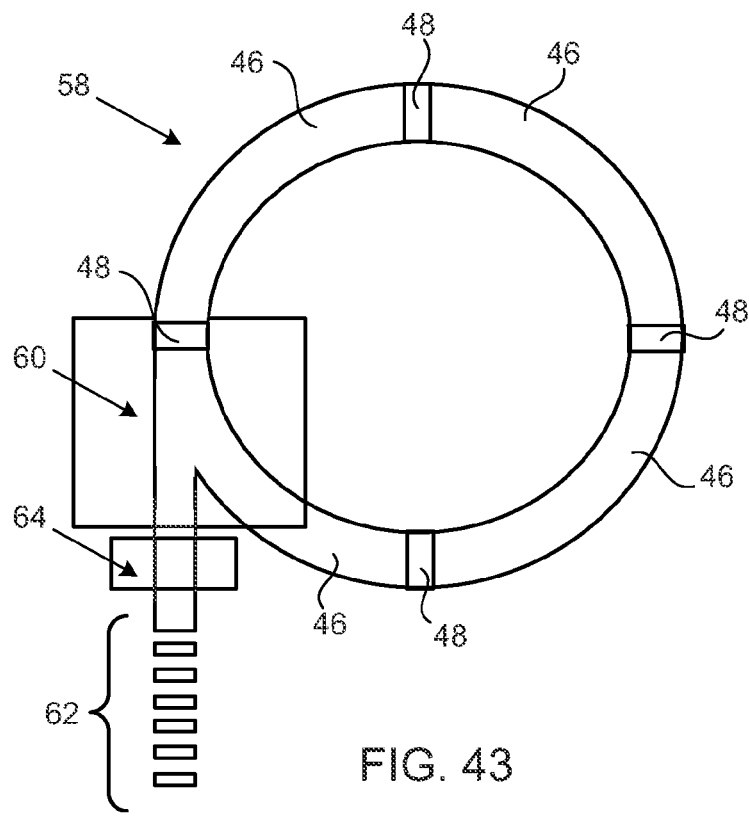
FIG. 43 is an illustration of a design for uni-directional lasing in the ring cavity.

In FIG. 43, the counter-clockwise (CCW) propagating light (in the orientation shown) is split at the Y-coupler 60. While one part keeps propagating along the ring 58, the other part is reflected on a Bragg mirror 62, and re-injected in the ring as clockwise (CW) propagating light. CW-propagating light, in contrast, is not split by the Y-coupler 60 and just keeps propagating in the ring 58. With each circulation, there is thus a net gain for CW light and a net loss for CCW light. Also shown in FIG. 43 is a phase-shift element 64 that enables the reflected light to be re-injected in the ring 58 in phase with the CW mode. The phase-shift element 64 can be implemented as a waveguide region electrically independent from the others, where the refractive index, and thus the optical length of the section, can be tuned by electrical or temperature effects. The use of a frequency-selective Bragg mirror 62 enables one to select a particular lasing wavelength. The ring 58, the surface grating 46 defined on the ring 58, and the four phase shifters 48 are otherwise similar to those described in reference to FIGS. 36 and 37.

Figure 44:
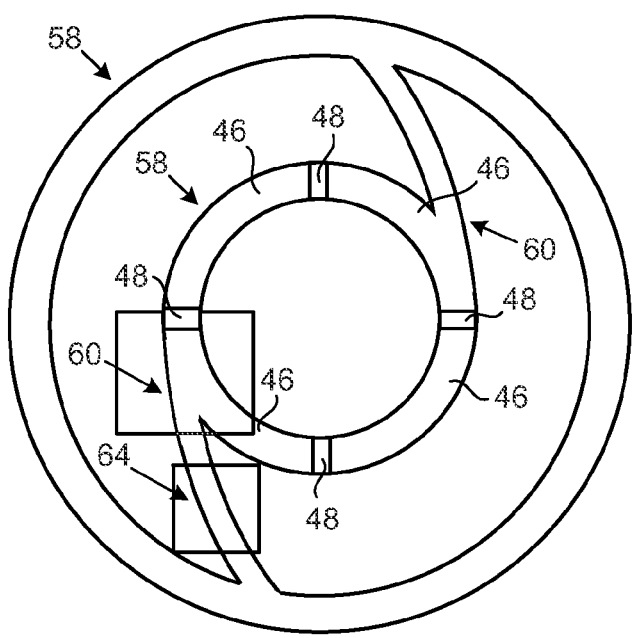
FIG. 44 is an illustration of another design for uni-directional lasing in the ring cavity.

In FIG. 44, a plurality of Y-couplers 60 are used (e.g., two are shown, though in other embodiments one or several can be used) to separate the two directions of propagation in two rings 58. The second order grating 46 (with phase shifters 48) can be defined on either ring 58. Phase-shift elements 64 have the same purpose as above.

Enhanced Coupling of Radiation Emission into Surface Plasmons by Using Plasmonic Meta-Surface:

In the designs shown in FIGS. 1 and 2, at the apertures, the laser emits both directly into the far-field and also into surface plasmons on the device facet. The ability to efficiently couple laser emission into surface plasmons on the laser facet is the key for optimization of plasmonic polarizers. As mentioned before, the plasmonic structures can only manipulate the phase of the surface plasmons, which give the desired polarization in the far-field. The direct emissions from the apertures, however, are not controlled; and the direct emissions, accordingly, produce an optical background in the far-field with the wrong polarization.

In the designs described in FIGS. 1 and 2, the coupling efficiency into surface plasmons is limited; and the overall energy of the direct emission from the aperture 16 is usually larger than that of the surface plasmon component. The surface plasmon component is not strong because the momentum of the surface plasmons is mismatched with the momentum of the laser light inside the laser waveguide. The latter is larger than the former by a factor of $n_{eff}$, which roughly equals the optical refractive index of the laser waveguide (e.g., about 3.2 for indium phosphide based mid-infrared QCLs).

FIG. 40 shows a design that can increase the momentum of the surface plasmons and thereby increase the coupling efficiency into surface plasmons. Whereas the linearly polarized direct emission from the aperture 16 in FIG. 2 may be a few times larger than the circularly polarized component produced by the gratings 14, the use of fine grooves can make the two components about equal in magnitude. As shown in FIG. 40, a group of fine grooves 52 are provided just outside the laser aperture 16. The periodicity of the fine grooves, $\Lambda_2$, is much smaller than the laser wavelength, $\lambda$ (e.g., smaller by a factor of about 10); and the fine grooves 52 have a shallower depth than the regular grooves 18 (e.g., 1 micron depth for the fine grooves compared with 1.5 micron depth for the regular grooves 18). The function of the fine grooves 52 is to create an effective medium (i.e., a "meta-surface") for the surface plasmons. Surface plasmons that propagate on the region with the fine grooves 52 have slower velocity (larger momentum), and are more confined to the facet—i.e., the meta-surface acts like a sponge for concentrating surface plasmons toward the surface interface. As a comparison, the scattering (large) grooves 18 have the periodicity, $\Lambda_1$, which is comparable to (the same or nearly the same as) the laser wavelength, $\lambda$.

The surface 54 patterned with fine grooves 52 is a "meta-surface" in the sense that the surface plasmons, which have a wavelength that is much greater than the periodicity of the fine grooves, $\Lambda_2$, can not "see" the details of the surface corrugations and only feel an effective medium. Accordingly, the basic elements of the meta-surface 54 are not limited to grooves but can also be, for example, other sub-wavelength-sized structures, such as apertures or indentations with other shapes. The meta-surface 54 may even not have the same elements or a constant element-to-element distance; for example, the meta-surface 54 can be composed of fine grooves with decreasing depth away from the aperture, or the meta-surface 54 can be an array of fine grooves with the same shape but with increasing inter-groove distance. To achieve the greatest advantage, one can establish the shape of the individual elements and/or the periodicity of the elements in the meta-surface 54 to balance the benefit from increased out-coupling into surface plasmons and the disadvantage that the meta-surface (with increased surface area) introduces additional absorption loss to the surface plasmons.

Figure 41:
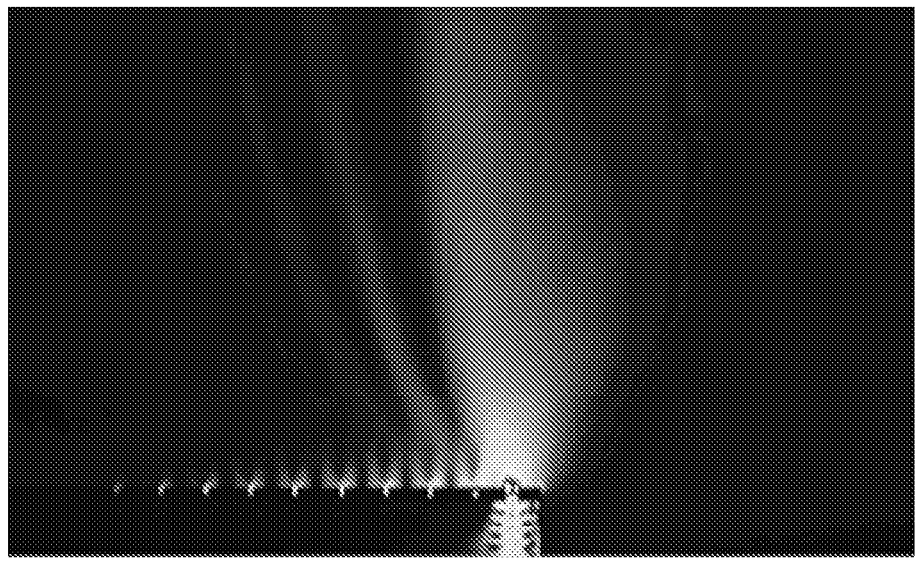
FIG. 41 shows the light output for a device with only the scattering grooves (large grooves).
Figure 42:
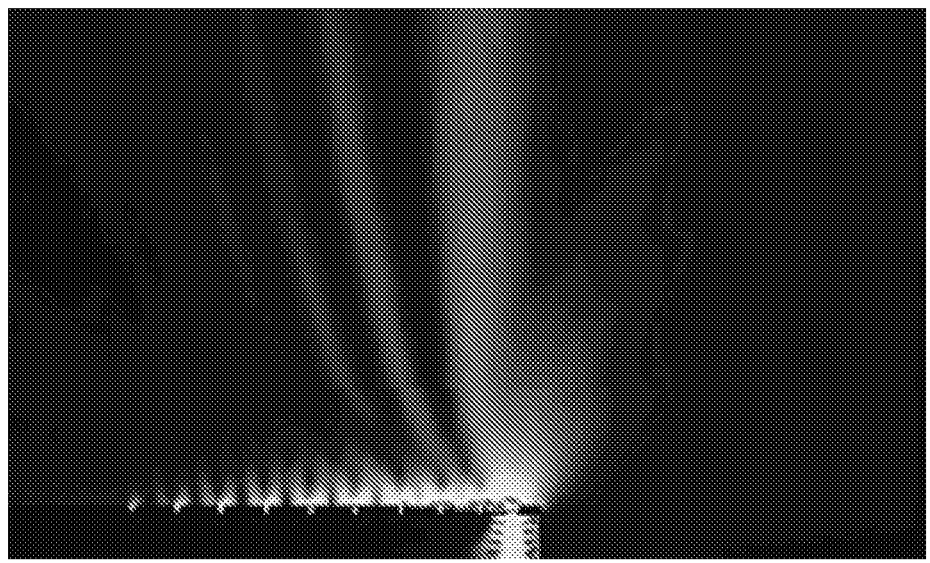
FIG. 42 shows the light output for a device with both the scattering grooves and fine grooves adjacent to the laser aperture.

FIGS. 41 and 42 compare a device with only the scattering (large) grooves with a second device that includes both the scattering grooves and fine grooves adjacent to the laser aperture. One can see that in the latter case, due to the existence of the meta-surface, the surface plasmons on the laser facet have much greater intensity compared to the former case. Specifically only about 30% of the laser energy is coupled into surface plasmons in FIG. 41, while about 46% of the laser energy is coupled into surface plasmons in FIG. 42.

Both devices lase at $\lambda=9.9$ μm. In FIG. 41, the scattering grooves 18 have a periodicity of 8.9 μm, a groove width of 0.8 μm, and a groove depth of 1.5 μm. In FIG. 42, there are fine grooves 52 within each of the first three periods of the scattering grooves 18. The fine grooves 52 have a width of 0.5 μm, and a period of 1.0 μm; their depth decreases from 1.25 μm in the first period, to 1.0 μm in the second period, and to 0.75 μm in the third period. All grooves 18 and 52 are defined on gold.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $\frac{1}{100}^{th}$, $\frac{1}{50}^{th}$, $\frac{1}{20}^{th}$, $\frac{1}{10}^{th}$, $\frac{1}{5}^{th}$, $\frac{1}{3}^{rd}$, $\frac{1}{2}$, $\frac{3}{4}^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety. Appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A radiation-emitting device for generating a radiation emission, the radiation-emitting device including:
   a ring-shaped waveguide;
   a grating on top of the waveguide, the grating including a series of features that couple out the radiation emission in the waveguide, the series of features including elements spaced apart from neighboring elements by a consistent fixed distance, and the series of features also including phase shifters that help achieve phase shift between radiation emissions from different regions of the ring-shaped waveguide to form circular or elliptical polarization in the far field; and a Y-coupler incorporated into the ring-shaped waveguide and configured to couple radiation propagating in one direction out of the ring-shaped waveguide while retaining radiation propagating in another direction in the ring-shaped waveguide.

2. The radiation-emitting device of claim 1, further comprising a Bragg mirror coupled with the Y-coupler outside the ring-shaped waveguide.

3. The radiation-emitting device of claim 2, further comprising an additional phase shift element between the Y-coupler and the ring-shaped waveguide.

4. The radiation-emitting device of claim 1, further comprising a second ring-shaped waveguide coupled with the Y-coupler incorporated into the first ring-shaped waveguide to receive radiation directed out of the first ring-shaped waveguide.

5. The radiation-emitting device of claim 1, wherein the features are apertures.

6. The radiation-emitting device of claim 1, wherein the radiation-emitting device is an active or passive optical component selected from an edge-emitting laser, an optical fiber, a fiber laser, a light-emitting diode (LED), and a vertical-cavity surface-emitting laser (VCSEL).

7. A radiation-emitting device for generating a radiation emission, the radiation-emitting device including:

a ring-shaped waveguide;

a grating on top of the waveguide, the grating including a series of apertures that couple out the radiation emission in the waveguide, the series of apertures including elements spaced apart from neighboring elements by a consistent fixed distance, and the series of apertures also including phase shifters that help achieve phase shift between radiation emissions from different regions of the ring-shaped waveguide to form circular or elliptical polarization in the far field, wherein the phase shifters include adjacent apertures that are spaced apart from each other by a different distance than the consistent distance separating adjacent apertures elsewhere in the regions of the ring-shaped waveguide.

8. The radiation-emitting device of claim 7, wherein the features include four phase shifters that separate four regions of the ring-shaped wave guide.

9. The radiation-emitting device of claim 8, wherein the four phase shifters are configured to produce surface emissions from the four regions with respective phases of $0, \pi/2, \pi,$ and $3\pi/2$.

10. The radiation-emitting device of claim 7, further comprising an active region configured to generate a radiation emission and to direct the radiation emission into the ring-shaped waveguide.

* * * * *